United States Patent
Fersdahl et al.

(10) Patent No.: US 11,187,800 B1
(45) Date of Patent: Nov. 30, 2021

(54) FUSION OF HORIZONTAL AND VERTICAL SWEEPS FOR WEATHER DETECTION

(71) Applicant: Rockwell Collins, Inc., Cedar Rapids, IA (US)

(72) Inventors: Mark C. Fersdahl, Cedar Rapids, IA (US); Nathanael A. Meyer, Cedar Rapids, IA (US); Luis R. Granadillo, Cedar Rapids, IA (US); Edward A. St. John, Solon, IA (US); Derek G. White, Indialantic, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 503 days.

(21) Appl. No.: 14/843,606

(22) Filed: Sep. 2, 2015

(51) Int. Cl.
*G01S 13/95* (2006.01)
*G01S 7/06* (2006.01)
*G01S 7/28* (2006.01)

(52) U.S. Cl.
CPC ............... *G01S 13/953* (2013.01); *G01S 7/06* (2013.01); *G01S 7/28* (2013.01)

(58) Field of Classification Search
CPC . G01S 13/953; G01S 7/06; G01S 7/28; G01S 7/24; G01S 7/292; G01S 7/22; G01S 7/062; G01S 7/18; G01C 21/005
USPC ...................................................... 342/26 B
See application file for complete search history.

(56) References Cited

U.S. PATENT DOCUMENTS

| | | | | |
|---|---|---|---|---|
| 3,134,975 A | * | 5/1964 | Goodman | G01S 1/02 342/136 |
| 3,397,397 A | * | 8/1968 | Barney | G01S 13/935 342/65 |
| 4,940,987 A | * | 7/1990 | Frederick | G01S 13/951 342/26 D |
| 5,202,690 A | * | 4/1993 | Frederick | G01S 13/953 342/26 B |
| 5,781,146 A | * | 7/1998 | Frederick | G01S 7/22 342/26 B |
| 5,828,332 A | * | 10/1998 | Frederick | G01S 13/953 342/26 B |
| 5,831,570 A | * | 11/1998 | Ammar | F41G 7/2286 342/26 B |
| 5,920,276 A | * | 7/1999 | Frederick | G01S 7/22 342/26 B |

(Continued)

FOREIGN PATENT DOCUMENTS

| | | | | |
|---|---|---|---|---|
| EP | 0943105 A1 | * | 9/1999 | G01S 7/16 |
| EP | 0943105 B1 | * | 8/2004 | G01S 7/22 |

*Primary Examiner* — Peter M Bythrow
*Assistant Examiner* — Nuzhat Pervin
(74) *Attorney, Agent, or Firm* — Suiter Swantz pc llo

(57) ABSTRACT

A weather radar module includes a memory, a vertical weather display, and a processor. The vertical weather display is configured to display weather in a vertical format. The processor is configured to control a radar antenna of the aircraft to perform a sweep in the horizontal direction and receive horizontal sweep radar returns, determine first weather parameters of a weather model in the vertical format based on the horizontal sweep radar returns, and store the first weather parameters in the memory. The processor is further configured to provide an estimate of the weather in the vertical format based on fusing vertical weather data, which is based on the vertical sweep radar returns, with the first weather parameters in the memory or with vertical display data based on the first weather parameters, and cause the vertical weather display to display the estimate of the weather in the vertical format.

19 Claims, 3 Drawing Sheets

(56) References Cited

U.S. PATENT DOCUMENTS

| | | | | |
|---|---|---|---|---|
| 6,424,288 B1* | 7/2002 | Woodell | ................ | G01S 7/2925 |
| | | | | 342/26 R |
| 6,738,011 B1* | 5/2004 | Evans | ................ | G01S 7/18 |
| | | | | 342/26 C |
| 7,109,913 B1* | 9/2006 | Paramore | ................ | G01C 23/00 |
| | | | | 342/26 B |
| 7,242,343 B1* | 7/2007 | Woodell | ................ | G01S 7/41 |
| | | | | 342/26 B |
| 7,417,578 B1* | 8/2008 | Woodell | ................ | G01S 13/953 |
| | | | | 342/26 R |
| 7,528,765 B1* | 5/2009 | Woodell | ................ | G01S 7/292 |
| | | | | 342/26 B |
| 7,664,601 B2* | 2/2010 | Daly, Jr. | ................ | G01S 13/953 |
| | | | | 702/3 |
| 7,696,921 B1* | 4/2010 | Finley | ................ | G01S 13/953 |
| | | | | 342/26 B |
| 7,733,264 B1* | 6/2010 | Woodell | ................ | G01W 1/10 |
| | | | | 342/26 B |
| 8,072,368 B1* | 12/2011 | Woodell | ................ | G01S 13/953 |
| | | | | 342/33 |
| 8,134,491 B1* | 3/2012 | Meyer | ................ | G01S 13/48 |
| | | | | 342/65 |
| 8,212,712 B2* | 7/2012 | Bon | ................ | G01S 7/062 |
| | | | | 342/26 R |
| 8,643,533 B1* | 2/2014 | Woodell | ................ | G01S 13/882 |
| | | | | 342/26 B |
| 8,742,974 B1* | 6/2014 | Sishtla | ................ | G01S 7/046 |
| | | | | 342/26 B |
| 8,786,486 B1* | 7/2014 | Sperling | ................ | G01S 13/953 |
| | | | | 342/26 B |
| 8,902,100 B1* | 12/2014 | Woodell | ................ | G01S 7/02 |
| | | | | 342/26 B |
| 2007/0247350 A1* | 10/2007 | Ryan | ................ | H03M 7/30 |
| | | | | 342/65 |
| 2010/0109942 A1* | 5/2010 | Bon | ................ | G01S 13/426 |
| | | | | 342/26 B |
| 2016/0131739 A1* | 5/2016 | Jinkins | ................ | G01S 13/953 |
| | | | | 342/26 B |

\* cited by examiner

FUSION OF HORIZONTAL AND VERTICAL SWEEPS FOR WEATHER DETECTION

BACKGROUND

The present invention relates generally to the field of radar weather detection, in particular with respect to airborne radar weather systems.

Pilots use weather radar systems to detect and avoid hazardous weather. The radar return signals are processed to provide graphical images to a radar display. Weather radar systems generally include an antenna, a receiver/transmitter circuit, a processor and a display. The processor is coupled between the display and the receiver/transmitter circuit. The receiver/transmitter circuit is coupled between the processor and the antenna.

The processor provides transmit signals through the receiver/transmitter circuit to the antenna to transmit radar beams. The processor receives radar return signals derived from radar returns received by the antenna. The radar return signals are provided to the processor via the receiver/transmitter circuit.

Radar systems may process and display data real-time. Each time a pulse is transmitted, the reflected echoes are immediately processed. Alternatively, instead of immediately displaying data corresponding to reflected echoes, the data is stored in memory for later processing. This memory system has proved sufficient to allow processing of horizontal or vertical scan data.

Airborne weather radar systems are known to display horizontal plan views of weather, which provides a view of weather in the horizontal plane looking down on the earth, and/or to provide a vertical display, where the axes are range and altitude. Weather radar may produce a vertical weather display from multiple horizontal sweeps or a dedicated vertical sweep. A vertical weather display can be produced at any azimuth by performing multiple horizontal sweeps at progressively different antenna tilt angles. For a given azimuth selection, vertical sweeps are performed by varying the antenna tilt angle at the selected azimuth angle.

SUMMARY

In one aspect, embodiments of the inventive concepts disclosed herein are directed to a weather radar module for an aircraft. The weather radar module includes a memory, a vertical weather display, and a processor. The vertical weather display is configured to display weather in a vertical format. The processor is configured to control a radar antenna of the aircraft to perform a sweep in the horizontal direction and receive horizontal sweep radar returns, determine first weather parameters of a weather model in the vertical format based on the horizontal sweep radar returns, and store the first weather parameters in the memory. The processor is further configured to control the radar antenna to perform a sweep in the vertical direction and receive vertical sweep radar returns, provide an estimate of the weather in the vertical format based on fusing vertical weather data, which is based on the vertical sweep radar returns, with the first weather parameters in the memory or with vertical display data based on the first weather parameters, and cause the vertical weather display to display the estimate of the weather in the vertical format.

In a further aspect, embodiments of the inventive concepts disclosed herein are directed to a method of estimating weather for an aircraft. A radar antenna of the aircraft is controlled, via a processor, to perform a sweep in the horizontal direction and receive horizontal sweep radar returns. First weather parameters of a weather model in the vertical format are determined, via the processor, based on the horizontal sweep radar returns. The first weather parameters are stored in a memory. The radar antenna is controlled, via the processor, to perform a sweep in the vertical direction and receive vertical sweep radar returns. An estimate of the weather in the vertical format is provided, via the processor, based on fusing vertical weather data, which is based on the vertical sweep radar returns, with the first weather parameters in the memory or with vertical display data based on the first weather parameters. The estimate of the weather in the vertical format is displayed on a display.

DETAILED DESCRIPTION

The present inventors have realized that providing a vertical weather display based on only horizontal sweeps, or on only vertical sweeps is not optimum. While using only horizontal sweeps in conjunction with a memory to store data would provide a timely and consistent display, the horizontal sweeps provide vertical weather information with a coarser resolution than vertical sweeps. On the other hand, using only a vertical sweep would provide vertical weather information with a finer resolution and an increased accuracy, but would not be timely because the antenna may need several seconds to position itself for the vertical sweep. Thus, a better solution than using only horizontal sweeps or vertical sweeps alone is a technique to fuse data from horizontal and vertical sweeps for the vertical display.

According to inventive concepts disclosed herein, a weather radar system may fuse the memory based horizontal weather data, based on horizontal sweep data, with vertical sweep data to create a vertical display. The radar provides a timely vertical display by utilizing both a memory based system from horizontal sweeps, and vertical antenna sweeps. Used alone, horizontal sweeps allow for a fast update response but with suboptimal vertical resolution and accuracy. Conversely, a vertical sweep can provide good vertical resolution and accuracy but with a delayed update due to mechanical positioning of the antenna. According to inventive concepts disclosed herein, a weather radar system provides an optimal vertical display by combining horizontal and vertical sweep data.

The vertical sweep data may also be held in the memory. Multiple vertical sweeps may be performed along the same azimuth and include them in the blending process to provide smoother and more accurate results.

Figure 1A:
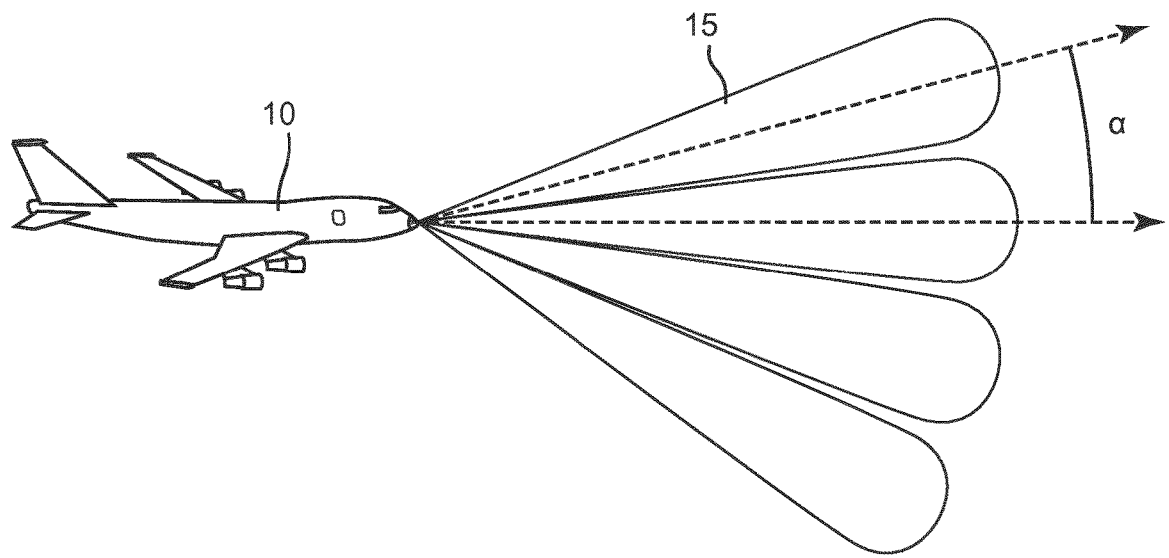
FIG. 1A is a side view illustrating typical horizontal sweeps for obtaining weather data from radar returns.
Figure 1B:
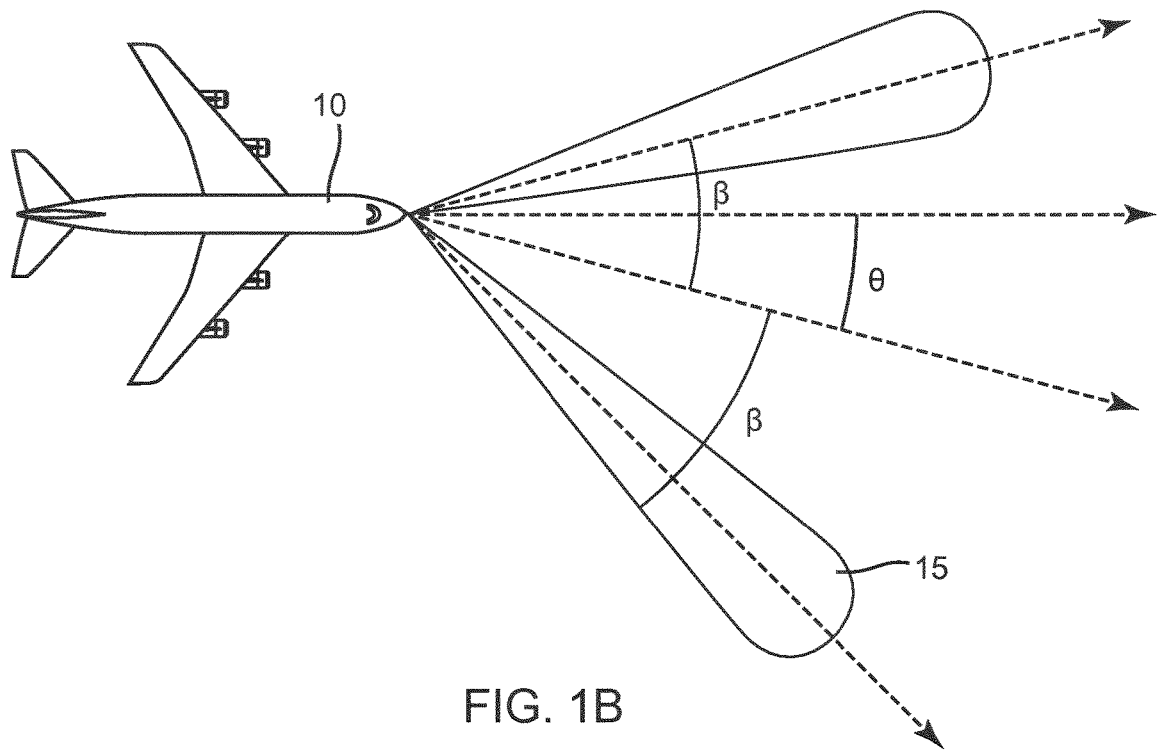
FIG. 1B is a top view of the horizontal sweeps of FIG. 1A.

FIGS. 1A and 1B illustrate typical horizontal sweeps for obtaining weather data from radar returns, where FIG. 1A is a side view and FIG. 1B is a top view. During the sweeps a radar beam 15 is projected from a radar antenna of an aircraft 10. As shown in FIG. 1A, there are four horizontal sweeps for the sake of illustration, although in practice there can be any number of horizontal sweeps. Each horizontal sweep has a direction of the radar beam 15 at a different antenna tilt angle $\alpha$ with respect to the horizontal plane. As can be seen in FIG. 1B, each horizontal sweep is performed about an azimuth angle $\theta$, over an angular range of $\theta-\beta$ to $\theta+\beta$.

Figure 2A:
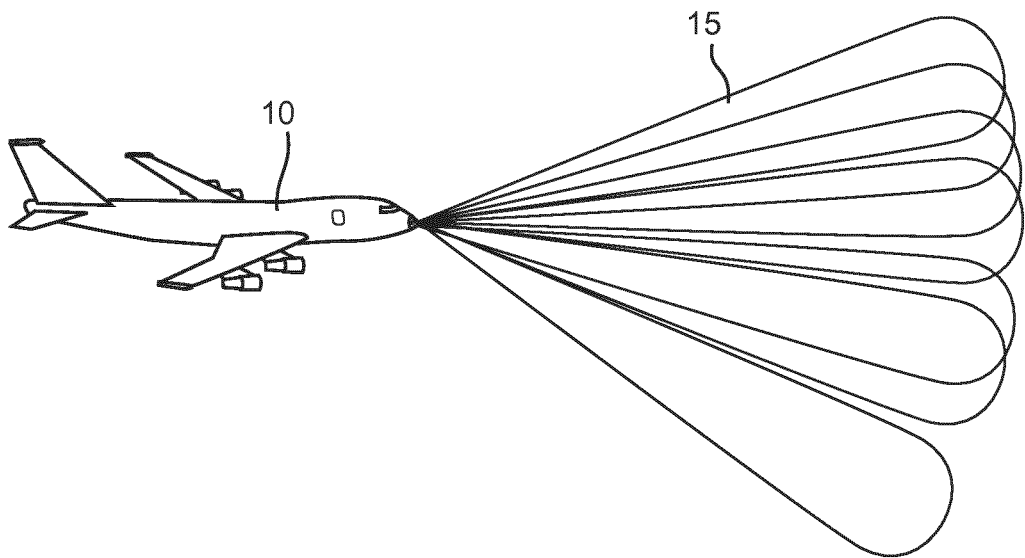
FIG. 2A is a side view illustrating a typical vertical sweep for obtaining weather data from radar returns.
Figure 2B:
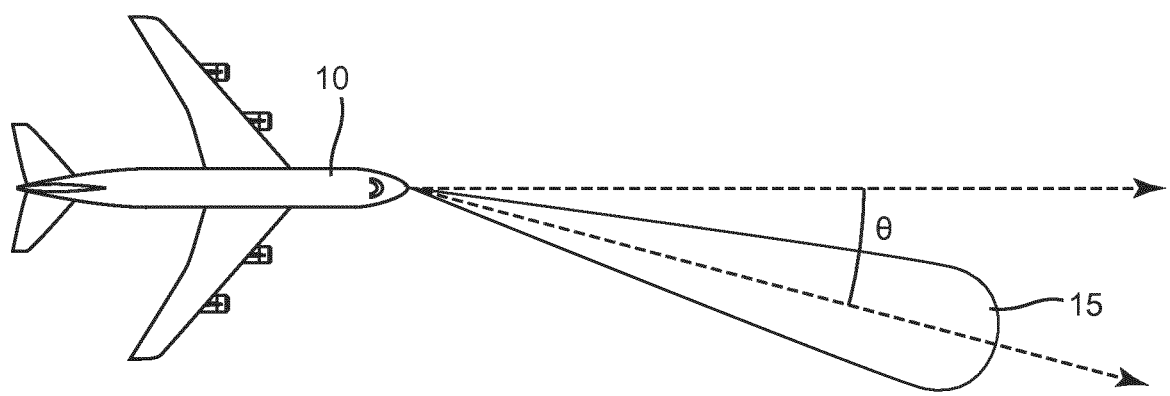
FIG. 2B is a top view of the vertical sweep of FIG. 2A.

FIGS. 2A and 2B illustrate a typical vertical sweep for obtaining weather data from radar returns, where FIG. 2A is a side view and FIG. 2B is a top view. The vertical sweep of the radar beam 15 is performed at an azimuth angle $\theta$ over a range of tilt angles $\alpha$ (see FIG. 1A for tilt angle $\alpha$) with respect to the horizontal plane.

In general, the horizontal sweeps provide a coarser resolution over the vertical direction than the vertical sweep.

Figure 3:
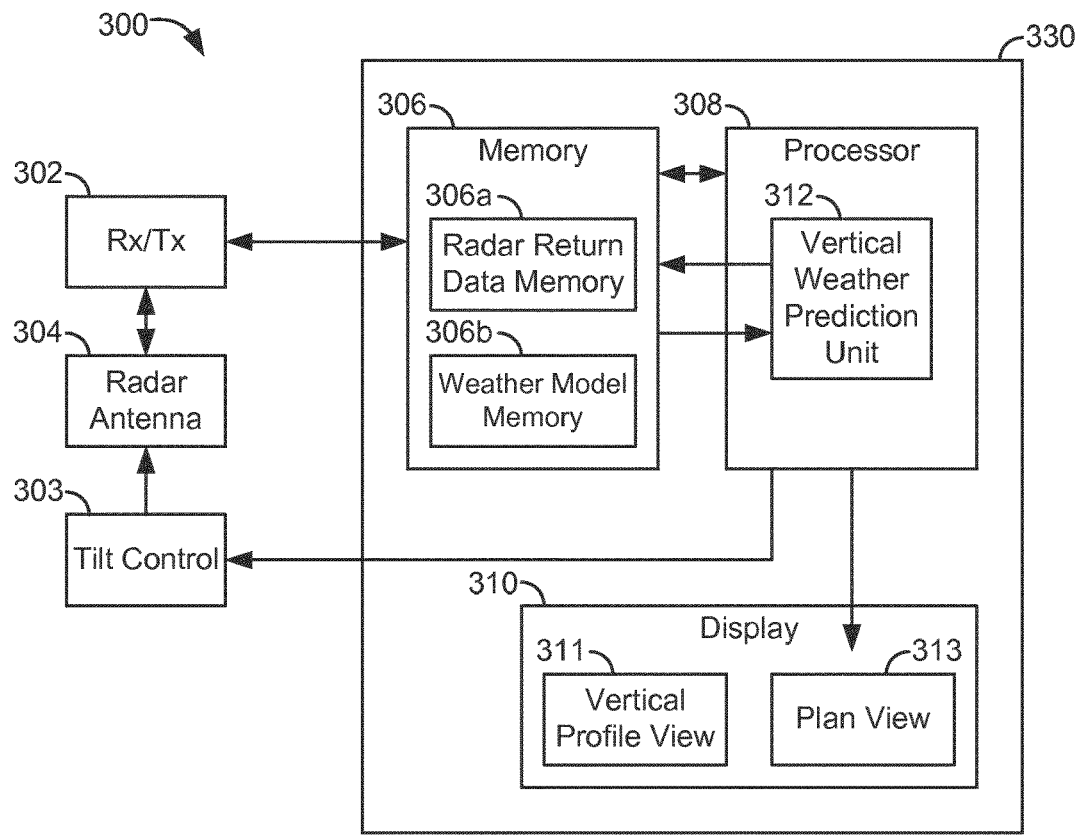
FIG. 3 is a schematic illustrating a weather radar module of an embodiment of the inventive concepts disclosed herein.

FIG. 3 illustrates a weather radar module 330 in a weather radar system 300, which may be used on an aircraft, according to inventive concepts described herein. Weather radar system 300 can be similar to the system described in U.S. Pat. No. 7,733,264, entitled "SYSTEM AND METHOD FOR GENERATING WEATHER RADAR INFORMATION" incorporated herein by reference, for example.

Weather radar system 300 includes a weather radar receiver/transmitter 302, a weather radar adjustable antenna 304, and the weather radar module 330, which includes a processor 308, and a multi-scan, multi-tilt angle, memory 306. System 300 also includes a tilt control 303 for automatically controlling the tilt angle of the antenna (mechanically or electronically) 304. This auto control may include an additional manual control feature as well.

Multi-scan, multi-tilt angle, memory 306 is preferably capable of storing in a readily addressable and rapidly retrievable manner, at least two data sets resulting from two or more antenna sweeps at different angles. Although preferred types of memory are discussed as memory 306, module 330 can utilize any type of storage system capable of storing radar returns or associated data for analysis/processing by processor 308. In one alternative embodiment, memory 306 can store weather parameters of a weather model. The memory 306 may comprise two sub-memories, for example, a radar return data memory 306a for storing radar returns or associated data, and weather model memory 306b for storing weather parameters of the weather model.

The weather radar module 330 may include a vertical weather prediction circuit 312 and a display 310. The data in multi-scan, multi-tilt angle, memory 306 or other storage unit can be used by vertical weather prediction circuit 312 to determine the weather that should be displayed on display 310.

Weather data can be stored in memory 306, such as in radar return data memory 306a. The weather data can be based on received horizontal or vertical scans, and stored. The data can be stored as a mathematical model representation of the information, and stored in weather model memory 306b. The mathematical model representation may be piecewise linear functions, piecewise nonlinear functions, coefficients of a cubic spline, coefficients of a polynomial function, etc. that represent vertical representations of the weather based on the horizontal scan data and/or horizontal representation of the weather based on the vertical scan data.

The display 310 can be part of an avionic multi-function display (MFD) unit. The processor 308 can be a multi-scan, multi-tilt angle, weather radar and can perform the customary functions performed by a conventional weather radar return processing unit, plus it can perform several additional operations based upon the additional data available in multi-scan, multi-tilt angle, memory 306. In general, processor 308 can merge or cross qualify portions, or ranges, of the radar returns of several different antenna sweeps at several different tilt angles, so that a single relatively clutter-free image is presented to the pilot based upon several separate scans.

Convective weather has a vertical reflectivity gradient which extends from the ground to a point where the radar can no longer detect echoes from the weather, typically at the top of the troposphere. This gradient may have similar characteristics from weather cell to weather cell. A typical weather cell will have substantial, nearly constant reflectivity between the ground and the height at which the atmospheric moisture begins to freeze, i.e., the freezing layer.

Above the freezing layer, the reflectivity falls off in a nearly linear manner until the storm generally tops out at the top of the troposphere. Functions representative of these type of gradients may be generated and stored in memory 306 for various range and azimuth locations along a flight path. Coefficients to the functions can be adjusted based on the received weather radar information. For example, some highly energetic weather cells may produce overshooting tops that intrude into the troposphere. A cells energy state can be estimated from its vertical gradient and dBz level aloft.

According to one weather model, the weather model is expressed as a polynomial function, and the weather model parameters may include a base radar beam reflectivity, and a slope of the radar beam reflectivity with respect to altitude. The weather is determined based on fitting the radar return data to the polynomial function.

The processor 308 is configured to store parametric characteristics, including the weather model parameters, of the vertical extent of the weather in memory 306 instead of detecting and storing the entire reflectivity profile in a traditional three-dimensional memory. For example, since the radar knows current altitude and outside air temperature, processor 308 can be configured to estimate the altitude of the local atmospheric freezing layer. Further, the processor 308 can estimate the height of the troposphere based on latitude, longitude and season using historical climate data, or more precise flight management system (FMS) data. Using this information and radar elevation scan data collected from normal horizontal multiple tilt processes, processor 308 is configured to generate a linear fit of the reflectivity data from the ground to the freezing layer and another linear fit between the freezing layer and top of the troposphere. Model parameters associated with the vertical profile in this embodiment can include, but are not limited to, the ground height, freezing layer height, the troposphere height, the reflectivity level at ground level, the reflectivity level at freezing layer, the reflectivity level at the troposphere top, and other aircraft inputs. This information is sufficient to generate a function which can generate vertical reflectivity at any altitude.

Alternative embodiments may use more complex curve fits. Specific curve fits can be utilized depending on model parameters of geographical location, time of day, time of year, etc. For example, over Europe, a linear curve fit may suffice to determine vertical reflectivity between freezing layer and troposphere height whereas a second order fit may be required over the equatorial Pacific. A tag can be given to each cell denoting the specific order of the data fit and, correspondingly, the method used to obtain vertical data from the stored parameters. As additional data is collected, perhaps through dedicated vertical scans of convective cells, the functions can be updated or increased in complexity in order to improve their accuracy.

This process allows a rapid display of data of data to pilots and assessment of vertical cell extent with a minimum of data. Rapid assessment may significantly increase the speed of such an assessment in turns or during initial radar power up.

Preferably, processor 308 processes weather radar returns to identify or sense the presence of weather in front of or in view of the aircraft. Vertical weather prediction preferably utilizes the altitude and the range to the weather to generate a vertical profile associated with the weather. The vertical profile can be associated with the assessment and sensing of the height of the weather system.

After vertical weather prediction circuit 312 generates a vertical profile for the weather based upon altitude and range, display 310 can show vertical profile screen 311 and plan screen 313 simultaneously. Vertical profile screen 311 may be configured to display the vertical profile generated by processor 308.

Vertical weather prediction circuit 312 can be a hardware or software implemented apparatus. In one embodiment, circuit 312 is a software routine that operates within processor 308. Although shown as part of processor 308, circuit 312 can be a separate circuit or be provided between display 310 and processor 308. According to one embodiment, circuit 312 can be implemented upon its own processor platform.

In one embodiment, vertical weather prediction circuit 312 determines the range and altitude associated with the sensed weather. The range and altitude are used so that vertical weather prediction circuit 312 can generate a vertical profile for sensed weather for display on display 310.

Fusing Horizontal Sweep and Vertical Sweep Data

Figure 4:
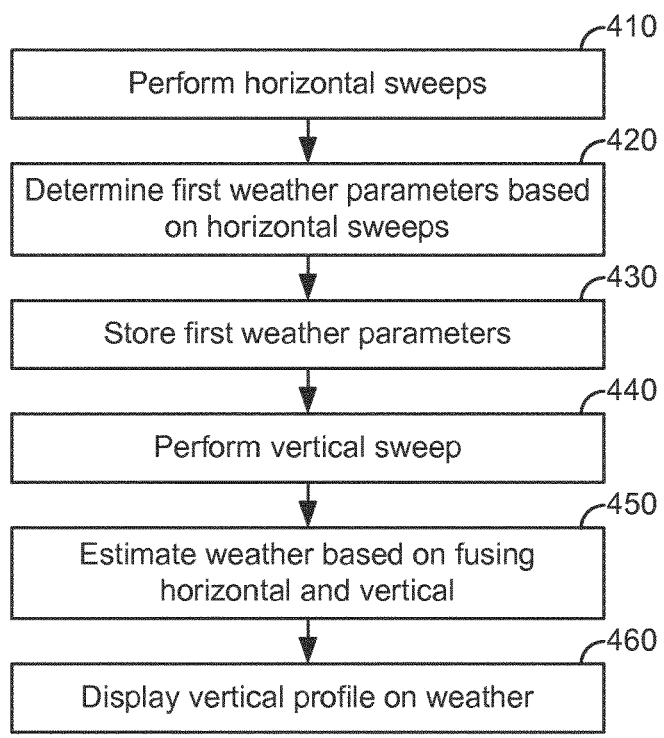
FIG. 4 is a flow chart illustrating a method of estimating and displaying weather on a vertical display based on fusing horizontal sweep and vertical sweep data according to an embodiment of the inventive concepts disclosed herein.

FIG. 4 is a flow chart illustrating a method of estimating and displaying weather on a vertical display based on fusing horizontal sweep and vertical sweep data using the weather radar module 330 in FIG. 3, where the method provides for a fast determination of a vertical profile of weather while at the same time having a fine resolution. In step 410, the processor 308 controls the radar antenna 304 of an aircraft via the tilt control 303 to performs horizontal sweeps in the horizontal direction, and receives, via the memory 306, for example, horizontal sweep radar returns based on the horizontal sweeps. The horizontal sweep radar return data may be stored in the radar return data memory 306a, and may in particular be stored in memory planes of the radar return data memory 306a.

The number of horizontal sweeps performed may be, for example, four sweeps, although the inventive concepts described herein are not restricted to four sweeps. In general, the sweeps in the horizontal direction provide a coarser resolution than the sweeps in the vertical direction. The processor 308 may be configured to perform the horizontal sweeps (and the later vertical sweep) based on receiving an input from an occupant of the aircraft, such as the pilot, or based on receiving a flight plan from FMS data. For example, the input from the occupant of the aircraft may include a selected azimuth direction to a point of interest to the pilot where there may be weather of interest.

In step 420, the processor 308 determines first weather parameters of a weather model in a vertical format based on the horizontal sweep radar returns. The vertical format may be expressed in altitude and range, for example. The weather model may be a mathematical function, which is at least one of a piecewise linear function, a piecewise nonlinear function, a cubic spline, or a polynomial. The weather model may include at least one of the model parameters of ground height, freezing layer height, troposphere height, radar reflectivity at ground level, radar reflectivity at freezing layer, or radar reflectivity at troposphere top, for example. The weather model may include at least one of model parameters of geographic location, time of day, or time of year, for example. The weather model may be a polynomial function, for example, where the first weather parameters may include base radar beam reflectivity and slope of radar beam reflectivity with respect to altitude.

In step 430, the first weather parameters are stored in the memory 306, such as in the weather model memory 306b, and thus a representation of the weather vertical structure, which is determined in step 420, is stored in the memory 306. The representation of the weather vertical structure may be used to determine a vertical weather profile.

In step 440, the processor 308 controls the radar antenna 304 of the aircraft via the tilt control 303 to perform a vertical sweep in the vertical direction, and receives, via the memory 306, for example, vertical sweep radar returns based on the vertical sweep.

In step 450, the processor 308 provides an estimate of the weather in the vertical format based on fusing vertical weather data, which is based on the vertical sweep radar returns, with the first weather parameters in the memory, or with vertical display data based on the first weather parameters. The fusing may be performed a number of ways.

(1) According to one way of fusing the vertical weather data with the first weather parameters, the vertical sweep radar returns are converted to second weather parameters of the weather model, and the second weather parameters are blended with the first weather parameters, and stored in the memory 306, such as in the weather model memory 306b. For example, when the weather model is a polynomial function, the second weather parameters may include base radar beam reflectivity and slope of radar beam reflectivity with respect to altitude. Once the second weather parameters, including base radar beam reflectivity and slope, based on the vertical sweep data are determined, the second weather parameters are then blended with the first weather parameters, which also include base radar beam reflectivity and slope, and stored in the weather model memory 306b.

(2) According to another way of fusing the vertical weather data with vertical display data based on the first weather parameters, the vertical sweep radar returns are blended with vertical display data based on the first weather parameters. In this case, the vertical sweep radar returns are not first converted to second weather parameters, but instead the raw high resolution vertical sweep radar return data is directly blended with the vertical display data based on the first weather parameters.

(3) According to another way of fusing the vertical weather data with the first weather parameters, the first weather parameters in the memory 306, such as in the weather model memory 306b, are calibrated based on the vertical sweep radar returns. For example, when the weather model is a polynomial function, and the first weather parameters include base radar beam reflectivity and slope of radar beam reflectivity with respect to altitude, the base radar beam reflectivity and slope of radar beam reflectivity may be calibrated using the vertical sweep radar returns. The calibrated base radar beam reflectivity and slope may then be stored in the memory 306, such as in the weather model memory 306b. This embodiment provides advantages in the case that the horizontal sweeps data may not be of sufficient quality to determine a robust slope value. The vertical sweep data improves the slope value through calibration.

(4) According to another way of fusing the vertical weather data with the first weather parameters, the location of storm tops of the weather based on the vertical sweep radar returns are estimated, and the first weather parameters in the memory 306 in the region of the storm tops are adjusted based on the raw vertical sweep radar returns. In this embodiment, the weather in the location of the storm stops is emphasized, and a more accurate estimate of weather in the location of the storm tops may be determined. This can be important where the weather near the storm tops is of special interest. In the case that the weather model is a polynomial function, and the first weather parameters include base radar beam reflectivity and slope of radar beam reflectivity with respect to altitude, the base radar beam reflectivity and slope are adjusted in the region near the storm tops based on the raw vertical sweep radar returns.

In step 460, the processor 308 determines the vertical display data from the estimate of the weather from step 460 and displays it in the vertical profile view 311 of the display 310. The vertical format may be expressed in range and altitude, for example.

According to inventive concepts disclosed herein, a weather radar system provides an optimal vertical display by combining horizontal sweeps, with its attendant speed, with a vertical sweep, with its attendant accuracy.

The embodiments of the invention have been described in detail with particular reference to preferred embodiments thereof, but it will be understood by those skilled in the art that variations and modifications can be effected within the spirit and scope of the invention.

What is claimed is:

1. A weather radar module for an aircraft, comprising:
a memory;
a vertical weather display configured to display weather in a vertical format, wherein the vertical format is expressed in range and altitude; and
a processor configured to:
control a radar antenna of the aircraft to perform a sweep in a horizontal direction and receive horizontal sweep radar returns;
determine first weather parameters of a weather model in the vertical format based on the horizontal sweep radar returns;
store the first weather parameters in the memory;
control the radar antenna to perform a sweep in a vertical direction and receive vertical sweep radar returns, wherein the sweep in the horizontal direction provides a coarser vertical resolution than the sweep in the vertical direction;
provide an estimate of the weather in the vertical format based on fusing vertical weather data, which is based on the vertical sweep radar returns, with the first weather parameters in the memory or with vertical display data based on the first weather parameters; and
cause the vertical weather display to display the estimate of the weather in the vertical format,
wherein the processor is configured to perform the sweeps based on receiving an input from an occupant of the aircraft or a flight plan from flight management system (FMS) data,
wherein the weather model includes at least one of model parameters of geographic location, time of day, or time of year,
wherein the weather model is at least one of a piecewise linear function, a piecewise nonlinear function, a cubic spline, or a polynomial function,
wherein first weather parameters include slope of radar beam reflectivity with respect to altitude.

2. The module of claim 1, wherein providing an estimate of the weather in the vertical format comprises converting the vertical sweep radar returns to second weather parameters of the weather model, and blending the second weather parameters with the first weather parameters.

3. The module of claim 1, wherein providing an estimate of the weather in the vertical format comprises blending the vertical sweep radar returns with vertical display data based on the first weather parameters.

4. The module of claim 1, wherein providing an estimate of the weather in the vertical format comprises calibrating the first weather parameters in the memory based on the vertical sweep radar returns.

5. The module of claim 1, wherein the weather model is at least the polynomial function, wherein the first weather parameters include base radar beam reflectivity and the slope of the radar beam reflectivity with respect to the altitude, wherein providing an estimate of the weather in the vertical format comprises estimating the location of storm tops of the weather based on the vertical sweep radar returns, and adjusting the first weather parameters in the memory in the region of the storm tops based on the vertical sweep radar returns, wherein the base radar beam reflectivity and the slope are adjusted in the region of the storm tops based on the vertical sweep radar returns.

6. The module of claim 1, wherein the processor is configured to perform the sweeps based on receiving the flight plan from the flight management system (FMS) data.

7. The module of claim 1, wherein the processor is configured to perform the sweeps based on receiving the input from the occupant of the aircraft, wherein the input from the occupant of the aircraft includes a selected azimuth direction.

8. The module of claim 1, wherein the weather model is at least the polynomial function, and the first weather parameters further includes base radar beam reflectivity.

9. The module of claim 1, wherein the weather model includes at least one of model parameters of ground height, freezing layer height, troposphere height, radar reflectivity at ground level, radar reflectivity at freezing layer, or radar reflectivity at troposphere top.

10. A method of estimating weather for an aircraft, comprising:
controlling, via a processor, a radar antenna of the aircraft to perform a sweep in a horizontal direction and receive horizontal sweep radar returns;
determining, via the processor, first weather parameters of a weather model in a vertical format, wherein the vertical format is expressed in range and altitude, based on the horizontal sweep radar returns;
storing the first weather parameters in a memory;
controlling, via the processor, the radar antenna to perform a sweep in a vertical direction and receive vertical sweep radar returns, wherein the sweep in the horizontal direction provides a coarser vertical resolution than the sweep in the vertical direction;
providing, via the processor, an estimate of the weather in the vertical format based on fusing vertical weather data, which is based on the vertical sweep radar returns, with the first weather parameters in the memory or with vertical display data based on the first weather parameters; and displaying on a display the estimate of the weather in the vertical format, wherein the processor is configured to perform the sweeps based on receiving an input from an occupant of the aircraft or a flight plan from flight management system (FMS) data, wherein the weather model includes at least one of model parameters of geographic location, time of day, or time of year, wherein the weather model is at least one of a piecewise linear function, a piecewise nonlinear function, a cubic spline, or a polynomial function, wherein first weather parameters include slope of radar beam reflectivity with respect to altitude.

11. The method of claim 10, wherein providing an estimate of the weather in the vertical format comprises converting the vertical sweep radar returns to second weather parameters of the weather model, and blending the second weather parameters with the first weather parameters.

12. The method of claim 10, wherein providing an estimate of the weather in the vertical format comprises blending the vertical sweep radar returns with vertical display data based on the first weather parameters.

13. The method of claim 10, wherein providing an estimate of the weather in the vertical format comprises calibrating the first weather parameters in the memory based on the vertical sweep radar returns.

14. The method of claim 10, wherein the weather model is at least the polynomial function, wherein the first weather parameters include base radar beam reflectivity and the slope of the radar beam reflectivity with respect to the altitude, wherein providing an estimate of the weather in the vertical format comprises estimating the location of storm tops of the weather based on the vertical sweep radar returns, and adjusting the first weather parameters in the memory in the region of the storm tops based on the vertical sweep radar returns, wherein the base radar beam reflectivity and the slope are adjusted in the region of the storm tops based on the vertical sweep radar returns.

15. The method of claim 10, wherein the sweep in the vertical direction is based on the flight plan from the flight management system (FMS) data.

16. The module of claim 1, wherein providing an estimate of the weather in the vertical format comprises: (a) converting the vertical sweep radar returns to second weather parameters of the weather model, and blending the second weather parameters with the first weather parameters; (b) blending the vertical sweep radar returns with vertical display data based on the first weather parameters; or (c) estimating the location of storm tops of the weather based on the vertical sweep radar returns, and adjusting the first weather parameters in the memory in the region of the storm tops based on the vertical sweep radar returns, wherein the weather model is at least the polynomial function, and the first weather parameters further include base radar beam reflectivity, wherein the processor is configured to perform the sweeps based on receiving the flight plan from the flight management system (FMS) data.

17. The module of claim 1, wherein providing an estimate of the weather in the vertical format comprises: (a) converting the vertical sweep radar returns to second weather parameters of the weather model, and blending the second weather parameters with the first weather parameters; (b) blending the vertical sweep radar returns with vertical display data based on the first weather parameters; or (c) estimating the location of storm tops of the weather based on the vertical sweep radar returns, and adjusting the first weather parameters in the memory in the region of the storm tops based on the vertical sweep radar returns, wherein the weather model is at least the polynomial function, and the first weather parameters further include base radar beam reflectivity, wherein the processor is configured to perform the sweeps based on receiving the input from the occupant of the aircraft, wherein the input from the occupant of the aircraft includes a selected azimuth direction.

18. The module of claim 5, wherein the processor is configured to perform the sweeps based on receiving the flight plan from the flight management system (FMS) data.

19. The module of claim 5, wherein the processor is configured to perform the sweeps based on receiving the input from the occupant of the aircraft, wherein the input from the occupant of the aircraft includes a selected azimuth direction.

* * * * *